US009807062B2

(12) United States Patent
Park et al.

(10) Patent No.: US 9,807,062 B2
(45) Date of Patent: Oct. 31, 2017

(54) METHOD AND APPARATUS FOR SELECTIVELY PROVIDING PROTECTION OF SCREEN INFORMATION DATA

(71) Applicant: SAMSUNG ELECTRONICS CO., LTD., Suwon-si (KR)

(72) Inventors: Sung-bum Park, Seongnam-si (KR); Yong-je Kim, Yongin-si (KR); Myung-jin Eom, Seoul (KR); Dae-Sung Cho, Seoul (KR); Woong-il Choi, Osan-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/038,057

(22) Filed: Sep. 26, 2013

(65) Prior Publication Data

US 2014/0101443 A1  Apr. 10, 2014

(30) Foreign Application Priority Data

Oct. 5, 2012  (KR) .................. 10-2012-0110687

(51) Int. Cl.
*H04L 29/06* (2006.01)
*G06F 21/60* (2013.01)

(52) U.S. Cl.
CPC .......... *H04L 63/0428* (2013.01); *G06F 21/60* (2013.01); *H04L 63/08* (2013.01); *H04L 63/105* (2013.01); *G06F 2221/2107* (2013.01)

(58) Field of Classification Search
CPC ......... H04L 63/0428; G06F 2221/2107; G06F 21/60; H04N 21/23; H04N 21/232; H04N 21/233; H04N 21/234; H04N 21/23406; H04N 21/23418; H04N 21/23476
See application file for complete search history.

(56) References Cited

U.S. PATENT DOCUMENTS

| 6,813,358 | B1* | 11/2004 | Di Crescenzo et al. ...... 380/280 |
| 7,428,636 | B1 | 9/2008 | Waldspurger et al. |
| 7,877,788 | B1 | 1/2011 | Topp et al. |
| 8,542,823 | B1* | 9/2013 | Nguyen et al. ................. 380/42 |
| 2008/0148071 | A1* | 6/2008 | Dettinger et al. ............ 713/193 |
| 2008/0273693 | A1* | 11/2008 | Au et al. ......................... 380/28 |
| 2009/0100529 | A1* | 4/2009 | Livnat et al. ................... 726/28 |
| 2010/0125602 | A1* | 5/2010 | Eisinger et al. .............. 707/781 |
| 2011/0107409 | A1 | 5/2011 | Wilkinson et al. |
| 2011/0251960 | A1* | 10/2011 | Holla et al. ..................... 705/51 |
| 2012/0233671 | A1* | 9/2012 | Beder et al. ..................... 726/4 |
| 2012/0317621 | A1* | 12/2012 | Mihara ............... G06F 21/6218 726/4 |
| 2013/0232543 | A1* | 9/2013 | Cheng et al. .................... 726/1 |

* cited by examiner

*Primary Examiner* — Eleni Shiferaw
*Assistant Examiner* — Alexander Lapian
(74) *Attorney, Agent, or Firm* — Sughrue Mion, PLLC

(57) ABSTRACT

A method and apparatus for enabling a cloud server to provide screen information data indicating a screen to be displayed on a client device are provided. The method of enabling a cloud server to provide screen information data relating to a screen to be displayed on a client device includes: generating the screen information data; determining whether or not to protect the generated screen information data based on characteristics of an object configuring the screen; encrypting the provided screen information data based on the determining; and transmitting the encrypted the screen information data to the client device.

17 Claims, 11 Drawing Sheets

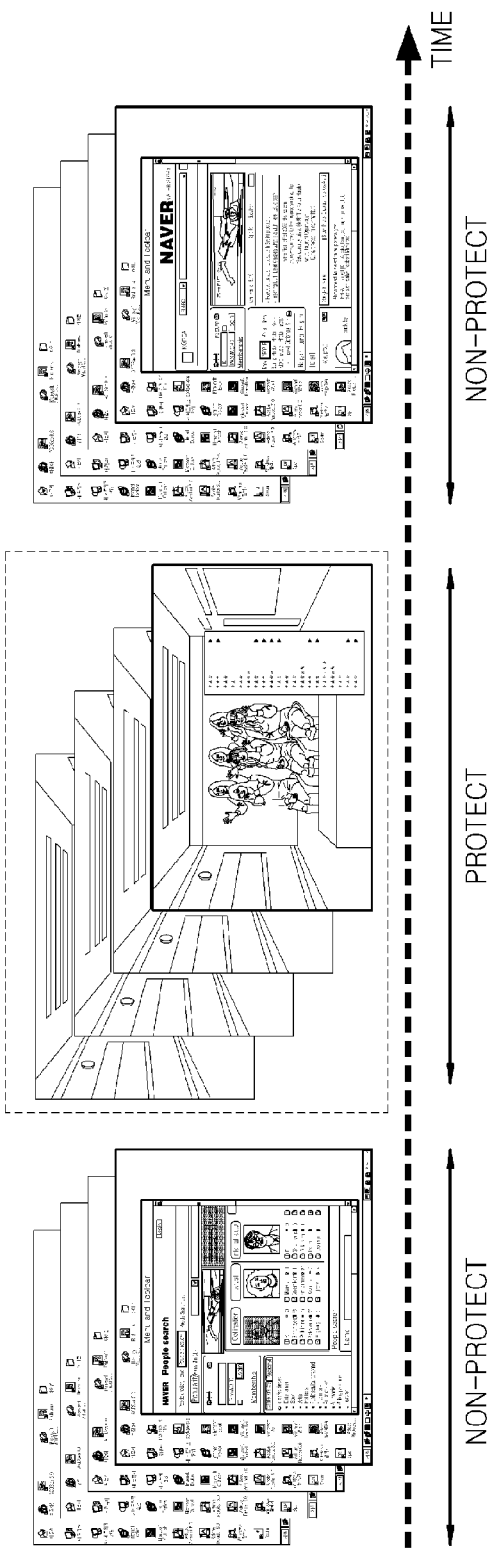

METHOD AND APPARATUS FOR SELECTIVELY PROVIDING PROTECTION OF SCREEN INFORMATION DATA

CROSS-REFERENCE TO RELATED PATENT APPLICATION

This application claims the benefit of Korean Patent Application No. 10-2012-0110687, filed on Oct. 5, 2012, in the Korean Intellectual Property Office, the disclosure of which is incorporated herein by reference, in its entirety.

BACKGROUND

1. Field

The exemplary embodiments relate to a technology of transmitting data and providing a screen for displaying data on a client device in a cloud server. More particularly, the exemplary embodiments to a technology of selectively encrypting data that is transmitted to the client device.

2. Description of the Related Art

Cloud Computing refers to computing environments based on the Internet or a network. Cloud computing builds program infrastructures in data servers that exist on the Internet, in order to allow users to use programs stored in the data server through computers, mobile phones, etc, when the users want to use the programs. In other words, users may use computing resources such as hardware and/or software existing in an intangible form, such as clouds, through terminals or through client devices such as computers or mobile phones. In recent years, cloud computing technologies have been developed to thus enable a server to perform most tasks and to enable a user to receive a screen which displays results of the program performed by the server through a thin client/zero client. The thin client/zero client is a client that only performs a role of a terminal for accessing a server and means that a client has less system requirements than the previous clients.

FIG. 1 illustrates an example of a cloud computing system. In the exemplary embodiments, a cloud server 100 means a server in which data is stored in the cloud computing system. Data stored in the cloud server includes software units such as programs and applications. Client devices 110 to 160 are terminals which are used to connect to the cloud server, and thus, devices that provide hardware units for displaying results processed by using the software units in the cloud server. Client devices may be personal computers (PC) 110, tablets 120, cellular phones 130, laptops 140 and smartphones 150. Of course, client devices are not limited to the above-mentioned exemplary examples. In addition, the client devices 110 to 160 may be display apparatuses and display devices 160 that are thin client/zero clients including at least components that receive user input and transmit the user input to a cloud server.

In the example of FIG. 1, the client devices receive control signals that are to be transmitted to the cloud server, and the cloud server performs an operation according to the control signals. For example, when a client device transmits a control signal to the cloud server so as to execute a specific application, the cloud server executes the specific application in accordance with the control signal, and transmits to the client device data for displaying the executed results.

In a general computing device, when a user inputs control signals through an input device such as a keyboard and a mouse, the control signals are processed by using an arithmetic unit and a storage device, such as a central processing unit (CPU) inside the computing device which has received the input control signals, and the processed results are output on a display device such as a monitor. In the cloud computing system, the client device transmits over the network to the cloud server, a control signal inputted through the client device and the cloud server performs an operation according to the control signal and then transmits data over the network to display the executed results on the client device.

In the cloud computing system, it is essential to transmit data that displays the executed results on the client device. Since the data that displays the executed results includes information executed in the client device, it is essential to maintain the security of data that is sent and received between the cloud server and the client device. In general, data that is transmitted between a server and a client is protected through a network transport security protocol such as a Secure Real-Time Transport Protocol (SRTP). However, in the case in which security problems occur at a network level, data that displays the results executed in the cloud server on a screen may be exposed to a third party. Therefore, separate from network-level security, a method of encrypting and transmitting data that is transmitted and received between a cloud server and a client device may be used. However, in the case of encrypting all data that is transmitted and received between a cloud server and a client device, the cloud server may become overloaded. As a result, transmission efficiency may also become significantly reduced, and thus, it is difficult to process signals in real-time that are entered by a user. Further, a separate device or process may be needed, thus incurring additional costs.

SUMMARY

The exemplary embodiments provide a method of encrypting data that is transmitted and received between a cloud server and a client device in a cloud computing system. Especially, the exemplary embodiments may selectively encrypt screen information data transmitted from a cloud server to a client device, thereby solving problems such as overload of the cloud server, and lowering of transmission efficiency.

In order to solve the above-mentioned problems, there is provided a method of enabling a cloud server to provide screen information data which provides a screen for displaying on a client device includes: generating the screen information data; determining whether or not to protect the screen information data base on characteristics of an object configuring the screen; encrypting the screen information data based on the determined results; and transmitting the encrypted screen information data.

The encrypting of the screen information data may include encrypting some of the screen information data.

The determining of whether or not to protect the screen information data may determine whether or not to protect the screen information data based on an application that runs in the cloud server, in order to display the object.

The determining of whether or not to protect the screen information data may determine whether or not to protect the screen information data based on the type of the object included on the screen.

The kind of object may include at least one of an image, a text and a video.

The encrypting of the screen information data may include encrypting the screen information data using an entropy encoding algorithm and a symbol mapping algorithm.

The method of providing the screen information data may further include determining whether or not the client device is valid; and in the case that the client device is valid, transmitting decoding information to the client device.

The determining of whether or not to protect the screen information data may include receiving criteria information related to the characteristics of the object in order to determine whether or not to protect the screen information data of the client device.

The determining of whether or not to protect the screen information data, may determine whether or not to protect the screen information data based on the characteristics of the object and predetermined time information.

The determining of whether or not to protect the screen information data, may determine whether or not to protect the screen information data that corresponds to coordinate information, based on the characteristics of the object and the predetermined coordinate information.

According to the exemplary embodiments, there is provided a cloud server configured to provide screen information data which provides that a screen that displays on a client device includes: a screen information data generator configured to generate the screen information data; a protection determiner configured to determine whether or not to protect the screen information data based on characteristics of an object configuring the screen; an encryptor configured to encrypt the screen information data based on the determined results; and a transmitter configured to transmit the encrypted screen information data.

The encryptor may be configured to encrypt some of the screen information data.

The protection determiner may be configured to determine whether or not to protect the screen information data based on an application that runs in the cloud server, in order to display the object.

The protection determiner may be configured to determine whether or not to protect the screen information data based on the type of the object included on the screen.

The object may include at least one of an image, a text and a video.

The encryptor may be configured to perform encryption using an entropy encoding algorithm and a symbol mapping algorithm.

The cloud server may further include a valid terminal decision module configured to determine whether or not the client device is a valid device, and may transmit decoding information to the client device in the case that the client device is valid, based on the results of the determining.

The cloud server may further include a receiver configured to receive criteria information related to the characteristics of the object in order to determine whether or not to protect the screen information data from the client device.

The protection determiner may be configured to determine whether or not to protect data based on the characteristics of the object and predetermined time information.

The protection determiner may be configured to determine whether or not to protect the screen information data that corresponds to coordinate information based on the characteristics of the object and the predetermined coordinate information.

BRIEF DESCRIPTION OF THE DRAWINGS

The above and other features and advantages of the present invention will become more apparent by describing in detail exemplary embodiments thereof with reference to the attached drawings in which:

FIG. 11 is a view which explains a method of protecting screen information data, according to another exemplary embodiment.

DETAILED DESCRIPTION OF THE INVENTION

As used herein, the term "and/or" includes any and all combinations of one or more of the associated listed items. Expressions such as "at least one of," when preceding a list of elements, modify the entire list of elements and do not modify the individual elements of the list.

Herein below, with reference to the accompanying drawings, an exemplary embodiment will be described in detail.

Figure 1:
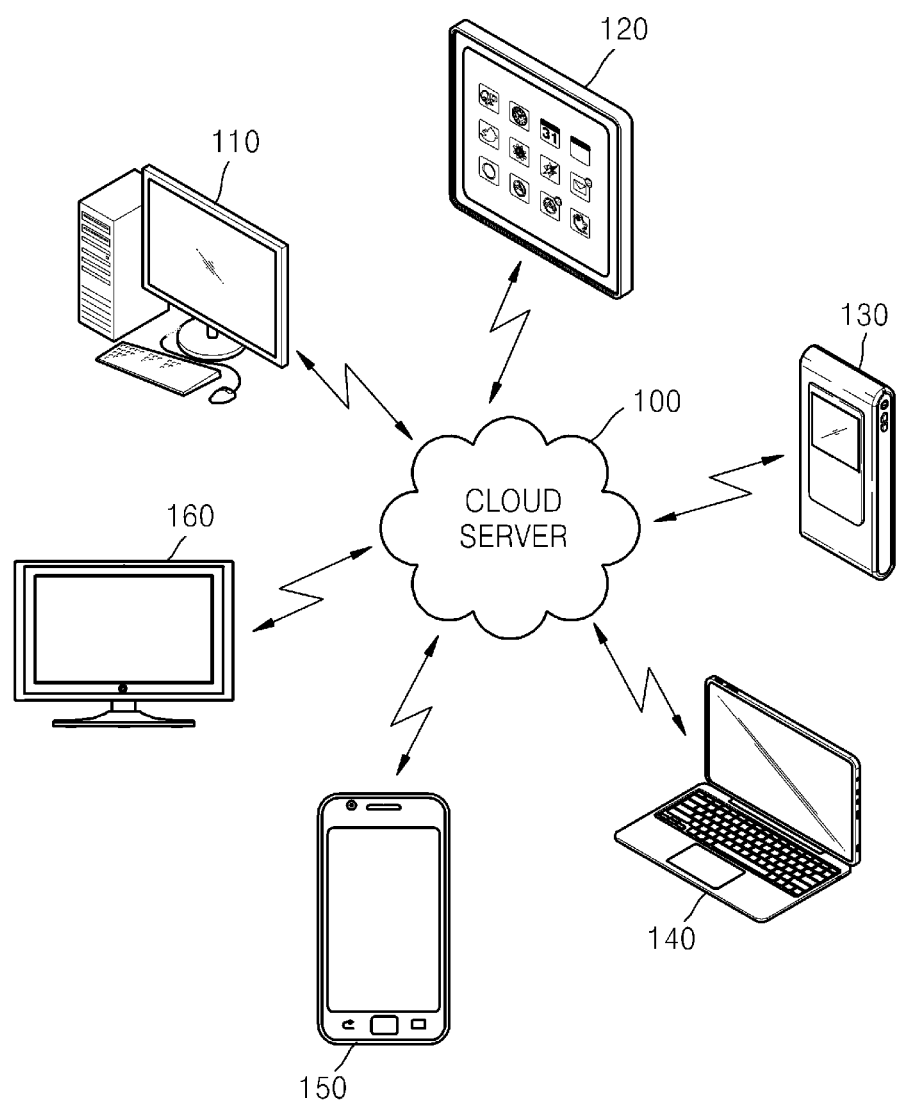
FIG. 1 shows a cloud computing system of the Related Art.
Figure 2:
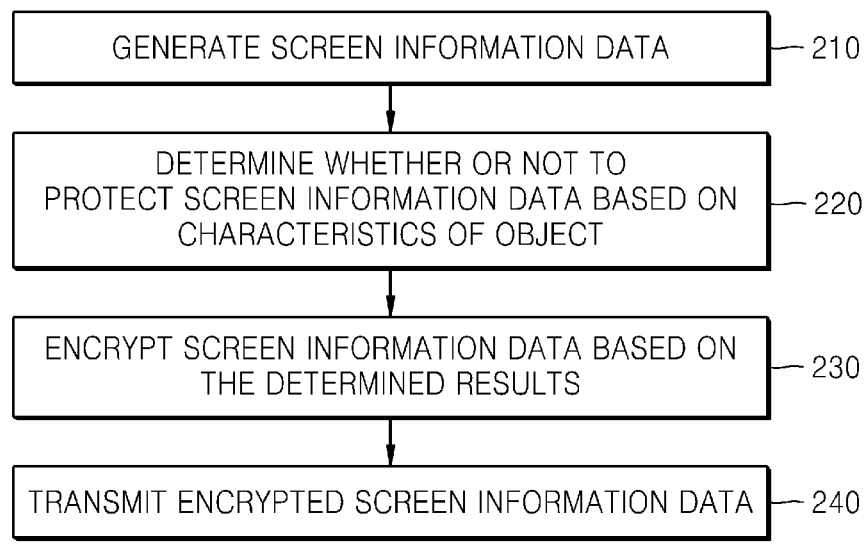
FIG. 2 illustrates a method of providing screen information data in a cloud server, according to an exemplary embodiment.

FIG. 2 illustrates a method of providing screen information data in a cloud server according to an exemplary embodiment.

In operation 210, a cloud server generates screen information data. The screen information data refers to information which indicates a screen displayed on a client device). In other words, when a client device receives a user input and then transmits to the cloud server information based on the received user input, a cloud server performs an operation according to the user's input signal. The cloud server transmits data which indicates a screen displaying the results to the client device, in order to display the results on the display of the client device that have been obtained by having performed the operation according to the input signal of the user. The screen information data may include an image, a frame, image information such as an image or a frame, and a bitmap and a bit stream that are generated to send the image, the frame, and the image information, but is not limited to the above examples.

As mentioned above, the client devices may be typical client devices that play a role of terminals such as PCs and smartphones so as to gain access to the cloud server, and may be a thin client or zero client that does not include an arithmetic unit (for example, a CPU) or includes the arithmetic unit at the least. In addition, the client device may include a user interface and thus may receive control signals from a user, through the user interface.

In operation 220, the cloud server determines whether or not to protect screen information data based on characteristics of an object. When the cloud server generates the screen information data to be transmitted to the client device, the cloud server determines whether or not to protect the screen information data based on the characteristics of the object, in order to encrypt the entire data or a specific area of the screen information data.

The object refers to all objects included within a screen such as a window, an icon, an image, a text, or a video that are generated by execution of an application such as Windows®, but is not limited to the examples above. In order to configure a screen including an object, the cloud server uses a display command. Accordingly, the cloud sever may recognize each of the objects included within the screen. Also, the cloud sever may recognize through another method an object displayed or to be displayed on the screen. The display command is a command that is used in the cloud server in order to generate the screen information data such as a frame and an image, and indicates which object should be displayed on which part of the screen.

The characteristics of the object refer to criteria for classifying the object. For example, the characteristics may include the kind of the object or an application that is executed in the cloud server in order to display the object in the screen information data. However, the exemplary embodiments are not limited to the examples above. The entire screen information data as well as only a portion of the screen information data may be protected. For example, a Web Browser application may be run in order to display an object such as a web page (for example, Google) with a specific address on the screen. In other words, in the case of intending to protect an object such as the web page the screen information data including a window showing the results executed by the web browser may be encrypted in the cloud server. In other words, considering an application that is executed in the cloud server, a determination may be made as to whether or not the corresponding screen information data needs to be protected. In addition, in the case of the object containing an image, a text or a video, the whole or part of the screen may be protected, depending on the type of object displayed on and contained within the screen.

The criteria for determining whether or not to protect the screen information data may be determined in accordance with policies that are provided by the cloud server. However policies may also be directly set by users. Of course, both may be considered, but the exemplary embodiments are not limited to the above examples. In particular, in the case of the text, a confirmation may be made which confirms whether or not a specific text is included in the screen information data via parsing, and in the case in which the specific text is included in the screen information data via parsing, the specific text or an object including the specific text may be set up to protect the data.

For example, when watching a movie by using the cloud computing system, a user connects to the cloud server through the client device, and runs a media player in order to play a movie stored in the cloud server. The cloud server plays the movie via the media player and transmits the screen information data to the client device, in order to display the movie on the client device. The window on the media player displayed on the screen may be one object, and the video of the movie itself may be also recognized as the object. Since the cloud server configures a screen on which the movie is played back, the cloud server may recognize that the object displayed on the screen is the object or video of the movie reproduced via the media player, and may determine whether or not to protect data, depending on the characteristics of the object.

In operation 230, the screen information data is encrypted according to the results of determining whether or not to protect the data. An encryption used herein does not simply refer to the encryption but may also contain encoding. In other words, the encryption may be performed at a stage of encoding the screen information data. Also, the encrypting may be included separate from the encoding. The encrypting includes all methods that may prevent a third party who is not a legitimate user from decrypting screen information data that is received through the client device. Therefore, the encrypting of the exemplary embodiments not only include a method of performing additional encryption after encoding, but also a method of performing only the encoding. Accordingly, all the methods of maintaining the security of the screen information data are included. In other words, the security can only be maintained through the encoding schemes such as an Entropy Encoding and a Symbol Mapping Algorithm. Even in the case of using only Entropy Encoding and the Symbol Mapping Algorithm, unless a user is legitimate user, information for decoding the symbol mapping (information for reverse mapping) is unknown, and thus the screen information data may be protected because the encoded screen information data cannot be decoded. The Entropy Encoding is an encoding scheme that varies the length of a code representing symbols according to probability of appearance of the symbols, and the Symbol Mapping Algorithm is an algorithm that maps the symbols as necessary. The Entropy Encoding and the Symbol Mapping Algorithm are obvious to those skilled in the art, and thus the detailed description thereof will be omitted.

In addition, the encryption method used herein may be a general encryption method such as a secret key or a public-key, and there is no limit to the encryption method used. As mentioned above, an encoding method may be also an Entropy Encoding and a Symbol Mapping Algorithm, and the encoding method is not limited to the above-mentioned example. Also, in the case in which it is necessary to encrypt only a partial area, that is, only a specific area, only data which corresponds to that area (for example, a bitmap or a bit stream of the corresponding area) may be encrypted.

In operation 240, the cloud server sends the screen information data that is encrypted or is not encrypted in response to it not being necessary to perform encryption on the client device. As described above, the transmission process may use a variety of methods (for example, SRTP) for the network-level security, and is not limited to the example above. The client device receives the screen information data and displays the received screen information data. The encrypted screen information data is decrypted so that it may be later displayed. Also, the cloud server and the client device may further perform an additional certification process to determine whether or not the client device is a client device of a legitimate user, who can receive the screen information data from the cloud server. The certification process is a general certification scheme that is performed between a client and a server, and it may be a method of requiring a password from the user via the client, or performing a certification using the client's MAC address. The exemplary embodiments are not limited to the example above, and the certification process would be obvious to those skilled in the art. Thus, the detailed description thereof will be omitted.

Additionally, the client device may receive information (for example, a decryption key, information for the reverse symbol mapping, etc.) needed to decrypt the encrypted screen information data through the certification process. The certification method between the client device and the cloud server is not restricted.

Figure 3:
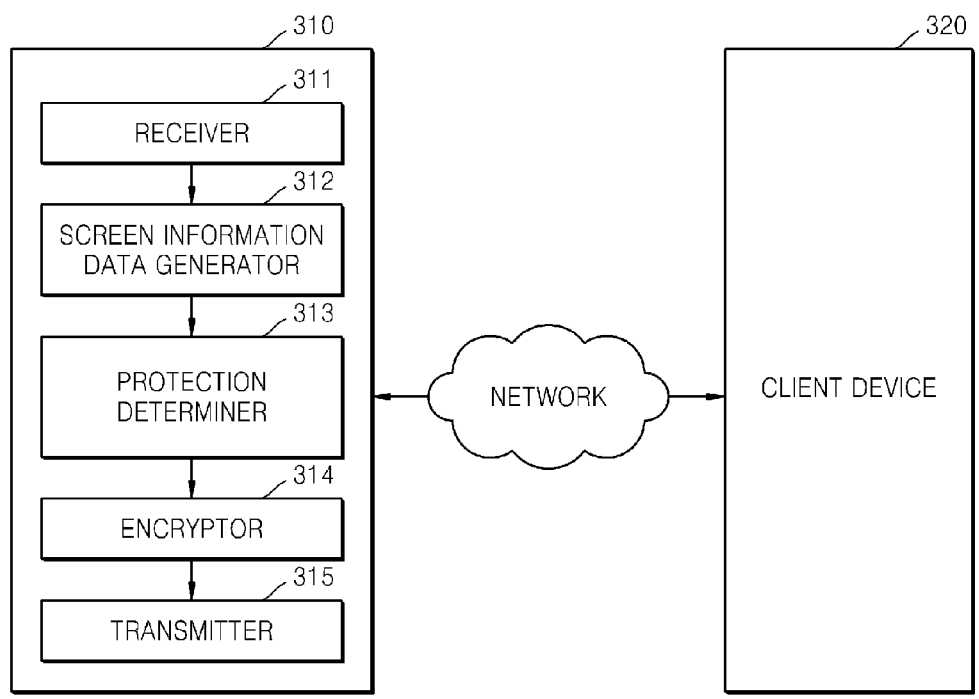
FIG. 3 is a block diagram illustrating a structure of a cloud server, according to an exemplary embodiment.

FIG. 3 is a block diagram illustrating a structure of a cloud server 310 according to an exemplary embodiment. The cloud server 310 includes a receiver 311, a screen information data generator 312, a protection determiner 313, an encryptor 314, and a transmitter 315.

The receiver 311 receives a control signal from a client device 320. Receiving the control signal refers to the client device 320 receiving a user input, and the client device 320 changes the user input into a signal so as to send a change signal to the cloud server 310.

The screen information data generator 312 generates screen information data which provides a screen to display the image on the client device 320. In other words, the screen information data generator 312 performs an operation according to the control signal received from the receiver 311 and generates the screen information data in order to display on the screen of the client device 320 the performed results.

The protection determiner 313 determines whether or not to protect the screen information data to be sent to the client device 320 depending on the characteristics of the object included in the performed results displayed on the screen. As shown in FIG. 2, the characteristics of the object are criteria used to classify the object. For example, the characteristics of the object may include the kind of the object or an application that is executed in the cloud server 310 in order to display the object on the screen information data. However, the exemplary embodiments are not limited to the example above.

The encryptor 314 encrypts the screen information data. In response to a determination as to whether or not to protect the screen information data, depending on the characteristics of the object, only part of the screen information data needing protection may be encrypted. Referring to the foregoing description, encryption of the exemplary embodiments includes all methods of maintaining security of the screen information data. The encryption may be performed in the case of additionally encrypting the screen information data together with encoding the screen information data, as well as in the case of encoding the screen information data.

The transmitter 315 transmits the screen information data to the client device 320, and the encryption process is executed or not executed depending on whether or not the screen information data needs to be protected. The screen information data is transmitted through the network to the client device 320.

The cloud server 310 may include a valid terminal decision unit (not shown). The screen information data that is encrypted and transmitted from the cloud servers 310 is decrypted and displayed on the client device 320. Information for decryption (for example, a decryption key, information for reverse symbol mapping, etc.) is required in order to decrypt the encrypted screen information data. The cloud server 310 may send information for decryption through a certification between the client device and the cloud server. The valid terminal decision device determines whether or not the client device is valid, and may transmit information for decoding via the transmitter 315.

Figure 4:
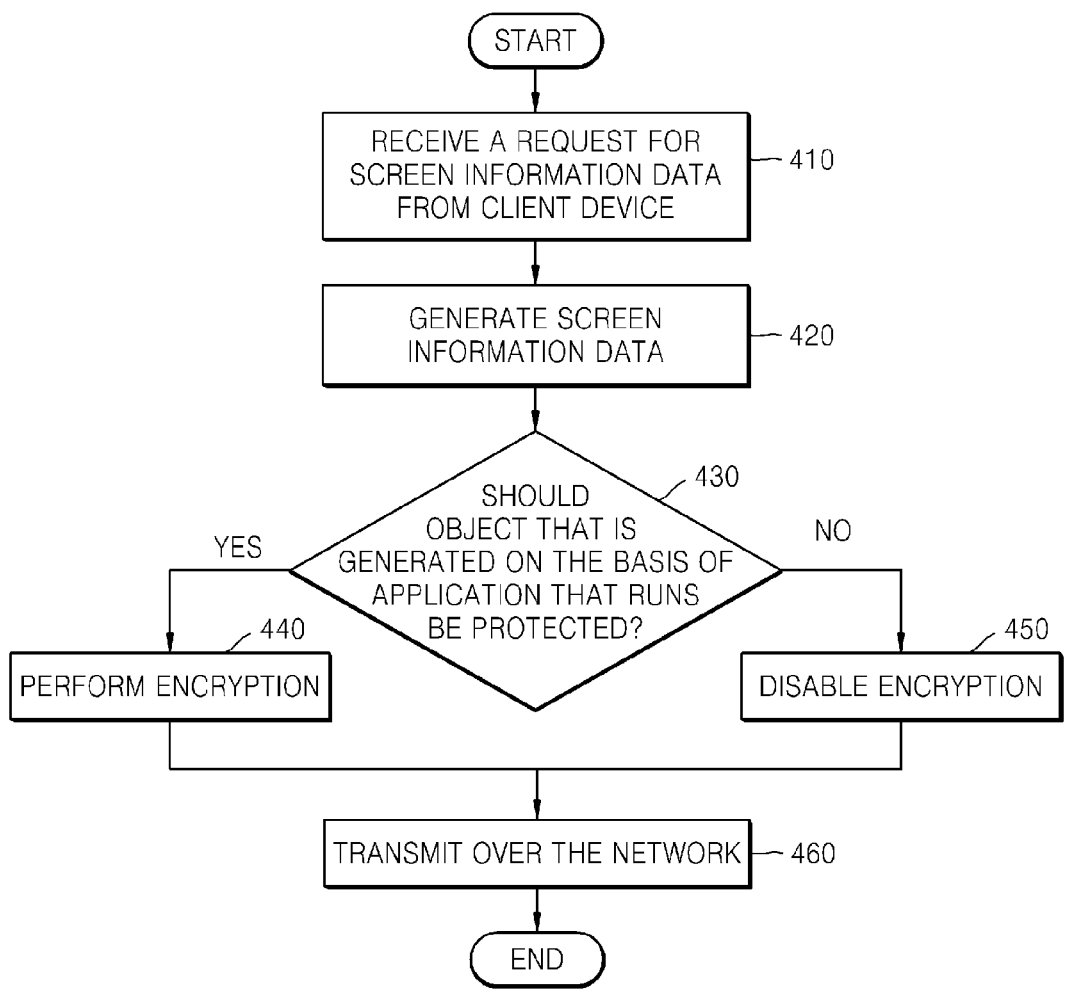
FIG. 4 illustrates a method of providing screen information data in a cloud server, according to another exemplary embodiment.

FIG. 4 illustrates a method of providing screen information data in a cloud server according to another exemplary embodiment. In particular, FIG. 4 illustrates an exemplary embodiment of determining whether or not to protect the screen information data depending on an application that is executed in the cloud server.

In operation 410, the cloud server receives a request for screen information data from the client device. In other words, the cloud server executes an application and, based on the executed results, receives a request for the screen information data to be outputted on the screen of the client device.

In operation 420, the cloud server generates the screen information data in accordance with the received request. The screen containing the executed results refers to a screen that contains an object based on the results of the execution of the application. The screen refers to a screen that is displayed on the display device. As mentioned above, the screen information data may include an image, a frame, a bitmap, a bit stream, etc., but is not limited to the examples above.

In operation 430, the cloud server determines whether or not to protect, through encryption, the object that is generated based on the application that is executed in the server. For example, in the case of wanting protection of a window that is created by execution of a web browser in the cloud server, protection criteria may be set as follows. In response to a user running the web browser within the cloud server through the client device, the cloud server runs the web browser, and thus an object (i.e., a window) is displayed on the screen that is generated as a result of running the web browser. That is, the object that is included on the screen is created depending on the application that is executed in the cloud server, and protection criteria to determine whether or not to protect the object or the screen information which includes the object may be set, depending on the application that is executed in the cloud server. When other applications such as media players are run, the object according to the executed results is included on the screen, and thus the cloud server may determine whether or not to protect the object, depending on the application being run. Protection criteria of the object may be provided from the cloud server at the time of the execution of any application or may be directly set. by users. In addition, protection criteria for an object (e.g., an image, a text and a video) within an object (e.g., a window) generated by the application, such as the web browser, may be set for each of the objects Furthermore, the object refers to all objects included within a screen such as a window, an icon, an image, a text or a video.

In addition, an object is created according to the execution of the application, and a display command is used in order to include the created object on the screen. Thus, the object may be recognized in accordance with the display command. Therefore, a determination may be made as to whether or not to protect the screen information data that contains the object on the basis of the display command. For example, the cloud server uses the display command when the cloud server generates the object to be outputted on the screen of the client device, depending on the execution of the application. In other words, the cloud server may determine which object is placed in which part of the screen, and whether another object is included in the placed object. The cloud server may determine the type of the object, the location of the object, and the object that is displayed depending on execution of the application, and thus the cloud server may determine whether or not to encrypt the screen information data in accordance with protection criteria that determines whether or not to protect the object.

In response to protection being needed in operation 430, the operation proceeds to operation 440, and in response to protection not being needed in operation 430, the operation proceeds to operation 450.

In operation 440, in response to protection being needed in operation 430, encryption is performed. As mentioned above, the entirety of the screen information data may be encrypted or only a fraction of the screen information data may be encrypted. In the case of encrypting only a fraction of the screen information data, only the screen information data which corresponds to an area of the object that is outputted on the screen may be encrypted, and encryption may include all operations of maintaining security of the screen information data. Additionally, the screen information data may be encrypted for a predetermined period of time when the object determined to require protection is outputted on the screen of the client device.

In operation 450, in the case of the object that does not need any protection, an encryption is not performed. In the exemplary embodiments, only the screen information data included the object needing a protection may be encrypted, thereby obtaining both effects of improving the transmission efficiency and increasing the security.

In operation 460, the screen information data generated in operation 440 or 450 is transmitted to the client device over the network.

Figure 5:
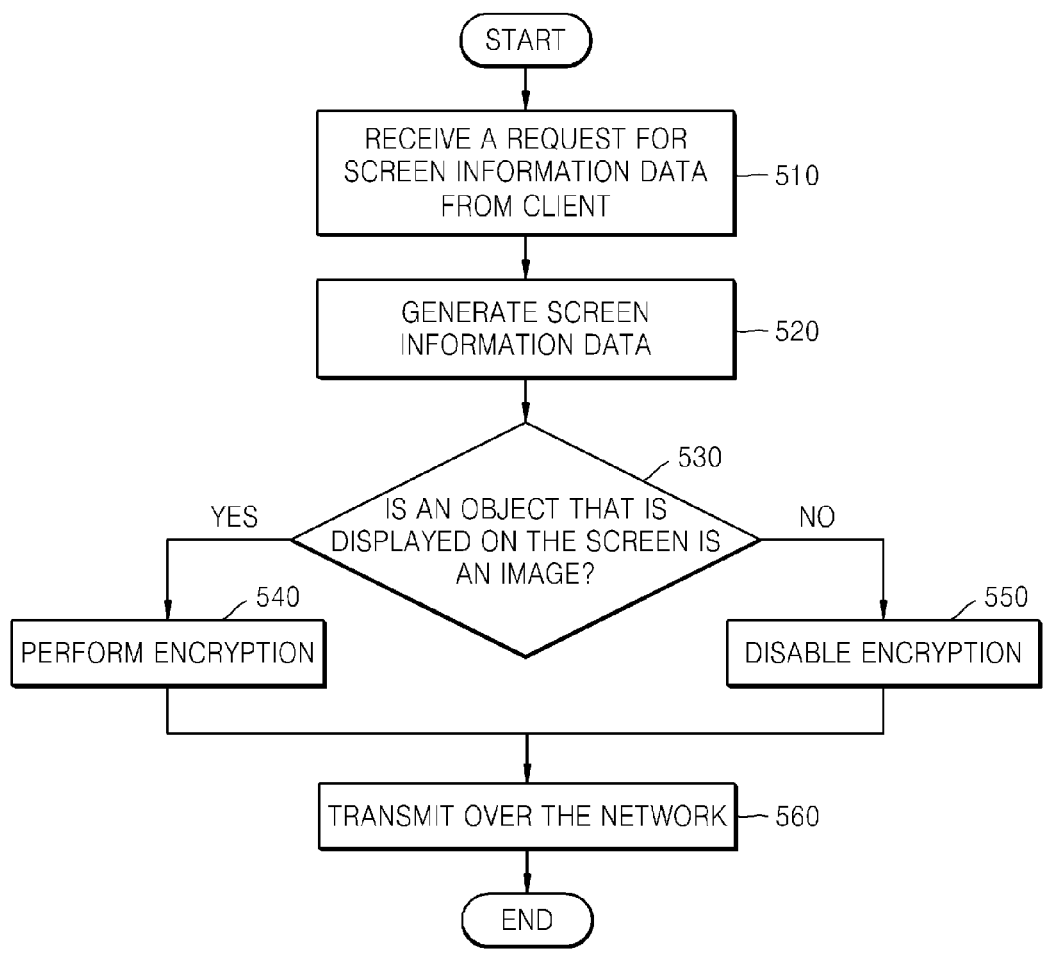
FIG. 5 illustrates a method of providing screen information data in a cloud server, according to another exemplary embodiment.

FIG. 5 illustrates a method of providing screen information data in a cloud server according to another exemplary embodiment. In particular, FIG. 5 is an exemplary embodiment of determining whether or not to protect the screen information data, based on the type of object included on the screen.

In operations 510 and 520, a request for the screen information data is received from the client device and the screen information data is generated in the same manner as that of operations 410 and 420 of FIG. 4.

In operation 530, in response to the object included on the screen being an image, the cloud server may determine that protection is needed. In other words, depending on the type of object that configures the screen for display on the client device, a determination is made as to whether or not to protect the object. That is, a determination is made as to whether or not to protect the screen information based on the type of object. In the exemplary embodiments, the kind of object may include a text, an image and a video, but the kind of the object is not limited to the above examples.

For example, in the case in which an image is included on the screen that is outputted depending on the screen information data generated from the cloud server, and the server is set up to protect an image or the entire screen that contains an image, the cloud server may determine that there is a need for protection of the screen information data that is generated.

Also, a determination may be made as to whether or not to protect the screen information data by determining whether or not the object that needs to be protected is included in the object generated when the application is run. For example, the cloud server may determine to protect the screen information data that corresponds to a region outputted by a password input method editor (IME) in the case of a window generated depending on the execution of the application of the web browser. As mentioned above, the screen information data may be protected by determining the area outputted by the password IME through text parsing, and the screen information data may be protected by setting a specific area for protection. As described above, the cloud server may identify the type of object through the display command and may identify the type of object through another method.

Also, in the case of the text, the text may be protected based on a determination that the text itself is the object, or a determination may be made as to whether or not to protect the text based on contents within the text that have a certain text and that are identified through parsing. In addition, a determination may also be made as to whether or not to protect the text contained in the image in the same manner. Operations 540, 550, and 560 are the same as operations 440, 450, and 460 of FIG. 4, respectively. Thus, repetitive explanation of the foregoing description is omitted.

Figure 6:
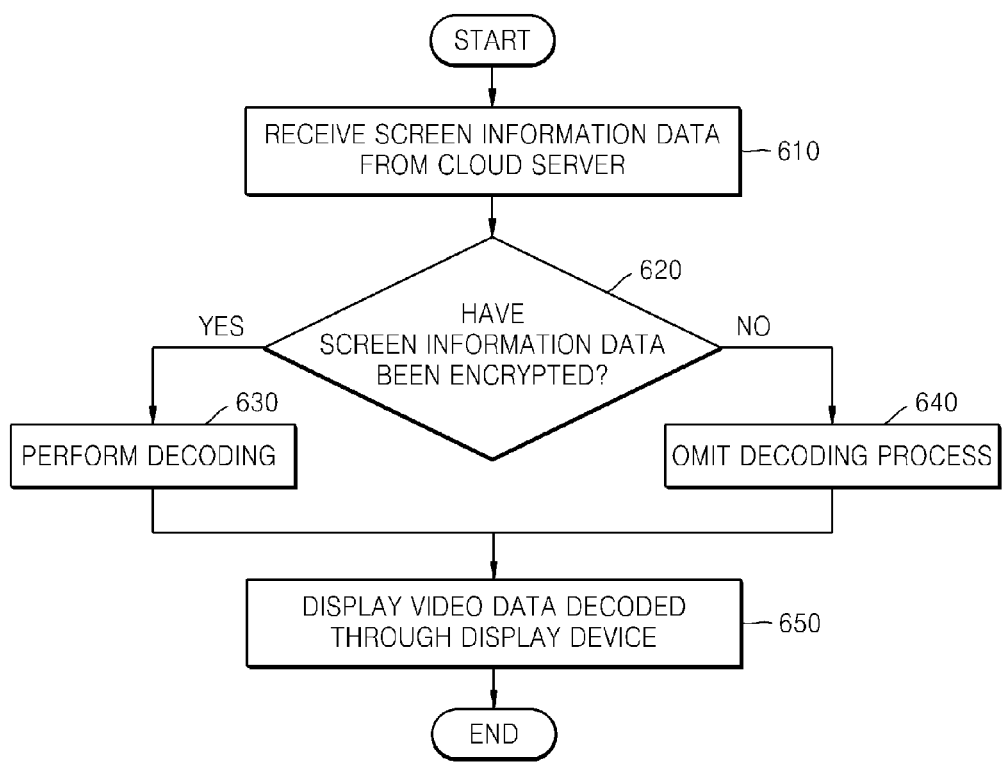
FIG. 6 illustrates a method of receiving screen information data in a client device, according to an exemplary embodiment.

FIG. 6 illustrates a method of receiving screen information data in a client device according to an exemplary embodiment.

In operation 610, the client device receives the screen information data from the cloud server. The screen information data is data to be displayed on the client device and refers to the screen information containing the results executed in the server.

In operation 620, the client device determines whether or not the received screen information data is encrypted. As mentioned above, in the case in which any object to be protected is not included on the screen, the screen information data is not encrypted. In the case in which the screen information data is encrypted, the operation proceeds to operation 630, and in the case in which the screen information data is not encrypted, the operation proceeds to operation 640.

In operations 630 and 640, the client device may perform a decryption process depending on whether or not the received screen information is encrypted. In response to the received screen information not being encrypted, the decryption process may be omitted. Decryption refers to all the decryption methods of displaying encrypted data on the screen of the client device through all encryption methods of maintaining security of the screen information data. In addition, in the case of simply encoding data for transmission over the network, even the screen information data that has not been encrypted may undergo a decoding process of the encoded data. In operation 650, the client device receives the screen information data, performs the decryption and/or decoding of the received screen information data, and then displays the decrypted and/or decoded screen information data on the display device.

Although not shown, the client device may include a controller, a decoder, a transmitter, a receiver, an input interface, and a display device. As mentioned above, the controller of the client device may not include a processor performing an operation, receives a user input via the user input interface, sends the received user input to the cloud server through the transmitter, receives the screen information data through the receiver, and decrypts or decodes the received screen information data in the decoder, and then displays the decrypted or decoded screen information data on the display device.

Figure 7:
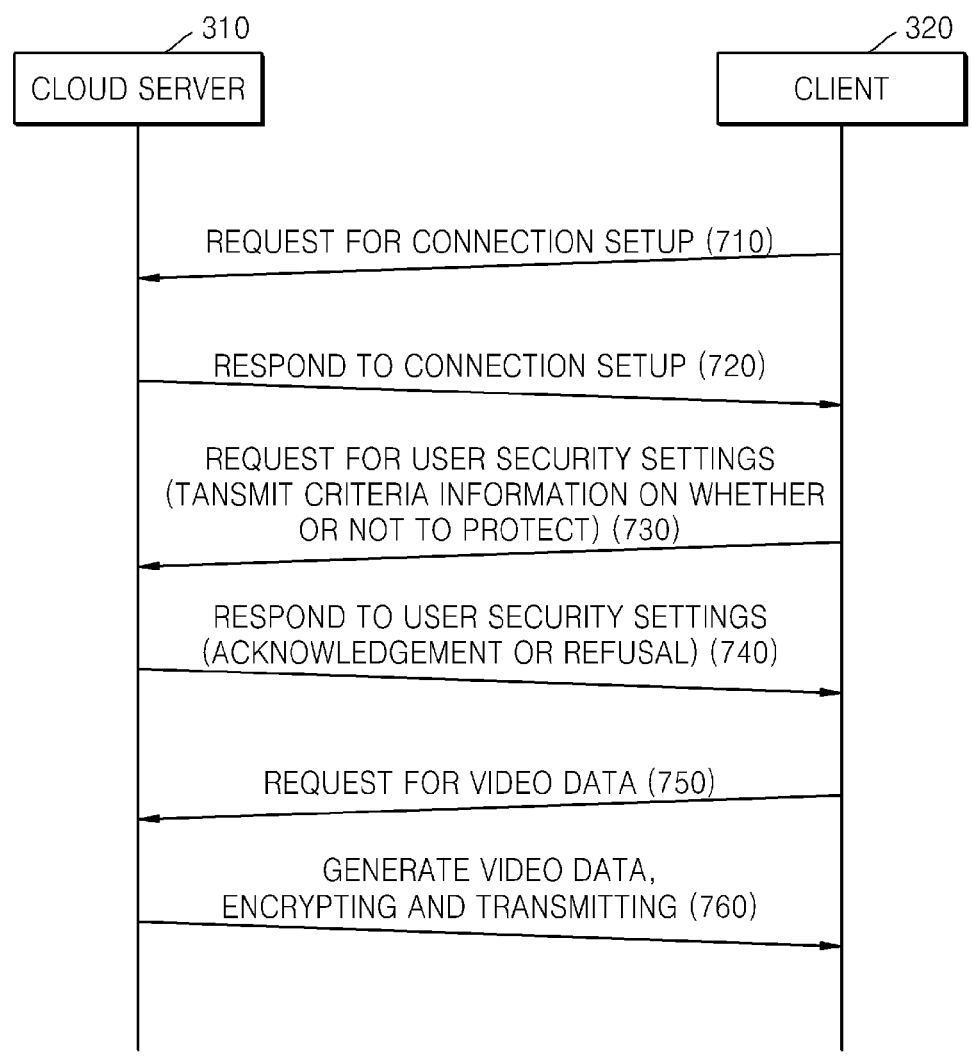
FIG. 7 illustrates a procedure of performing communications between a client device and a cloud server, according to an exemplary embodiment.

FIG. 7 illustrates a procedure of performing communications between a cloud server 310 and a client device 320 according to an exemplary embodiment.

In operations 710 and 720, the client device 320 may perform a connection setup to access the cloud server 310. In other words, the connection setup may include many kinds of information such as protocol information of a device, information related to the communication performance of the device, information for a method of data modulation and demodulation, and information to establish data communications between the client device and the cloud device. The process of the connection setup may include a process of typically sending and receiving the required information (e.g., IP addresses, data formats, etc.) in order to facilitate communication between a terminal and a server. In addition, as mentioned above, during the connection setup, the cloud server 310 may perform a certification procedure to determine whether or not the client device 320 is an appropriate device. In response to the client device being valid based on the result of performing the certification procedure, the cloud server may send to the client device the information needed for decoding.

In operations 730 and 740, the client device 320 transmits criteria information whether or not to protect data to the cloud server 310. Criteria information whether or not to protect data is information on the criteria used to determine which object contained within the screen is to be protected. As described with reference to FIG. 2, a determination may be made as to whether or not to protect data, depending on the characteristics of the object, and the description of the characteristics of the object are the same as the foregoing description thereof. Thus, the detailed description thereof will be omitted. The client device may determine which object to protect based on the characteristics of the object and the user's input. Also, the client device may send, to the cloud server, criteria information relating to whether or not to protect data, to thereby set up the criteria information in order to protect the screen information data that is generated at a specific time.

In operations 750 and 760, which were previously described with reference to FIG. 2, the cloud server generates the screen information data, and provides the client device with the generated screen information.

Figure 8:
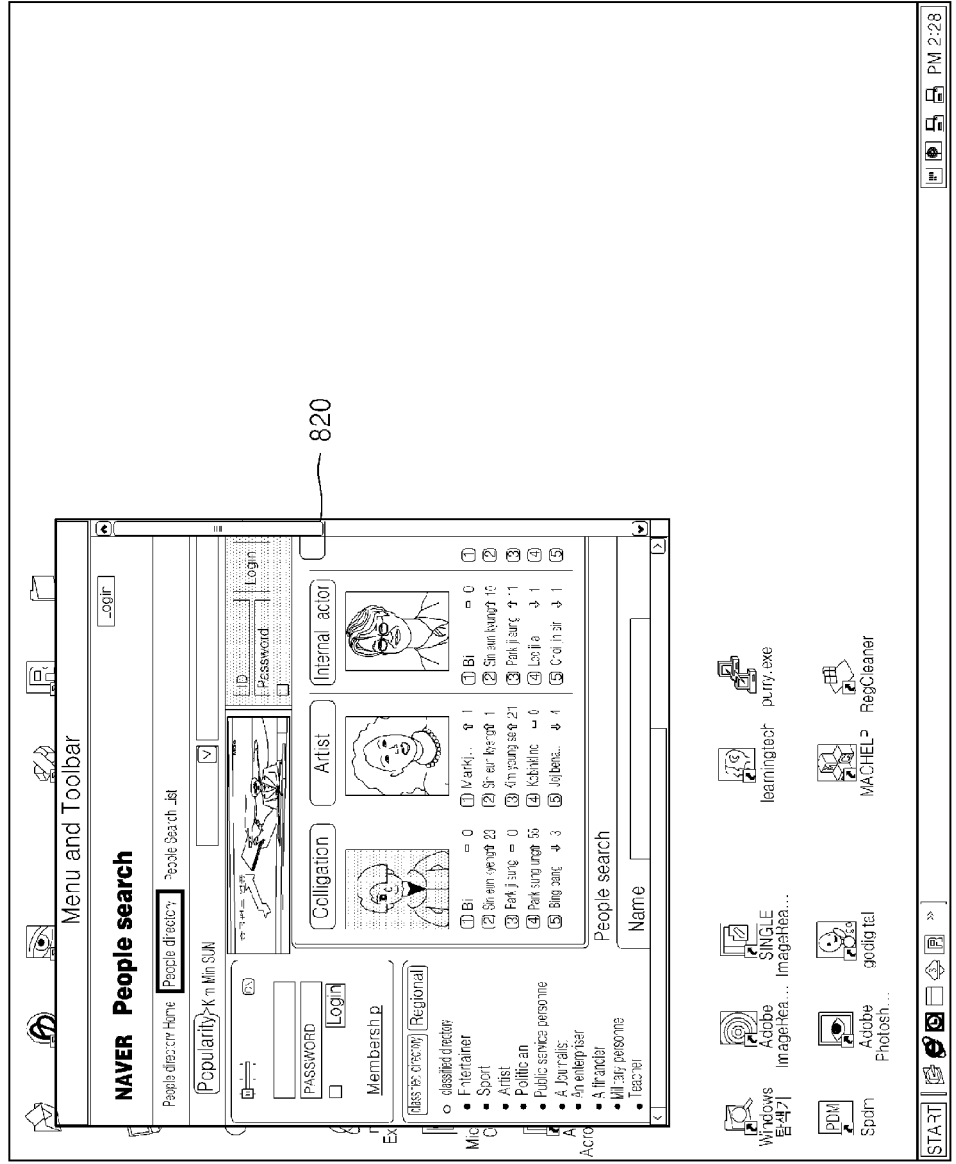
FIG. 8 is a view which explains a method of protecting screen information data, according to an exemplary embodiment.

FIG. 8 shows a protected area on a screen that is sent to a client device according to an exemplary embodiment.

FIG. 8 shows a case in which an object is displayed on the screen. For example, in the case in which a user executes a media player through the client device, a window 820 with an executed media player is displayed on the screen. When the media player runs, the object is generated so as to display the executed results on the screen, and thus the generated screen information data may be encrypted in the cloud server in order to protect the corresponding object when the media player runs.

In addition, as mentioned above, the cloud server may use a display command to generate the screen information data that is to be displayed on the screen of the client device. The display command is an instruction word that is used in the cloud server to generate the screen information data, such as a frame and an image, thereby indicating which object should be displayed in a particular part of the screen.

When the screen information data generated at the time of execution of the media player is set up to be protected while running in the cloud server, the screen information data corresponding to the area of an object which corresponds to the screen information data may be encrypted, and since only one object is displayed on the entire screen by the execution of the media player, the screen information data of the entire screen may be encrypted. Also, in the case in which execution of the media player is interrupted by the client device (for example, at the end of execution of the media player), the object that is displayed by the execution of the media player is no longer included on the screen, and thus the cloud server does not encrypt the screen information data.

Figure 9:
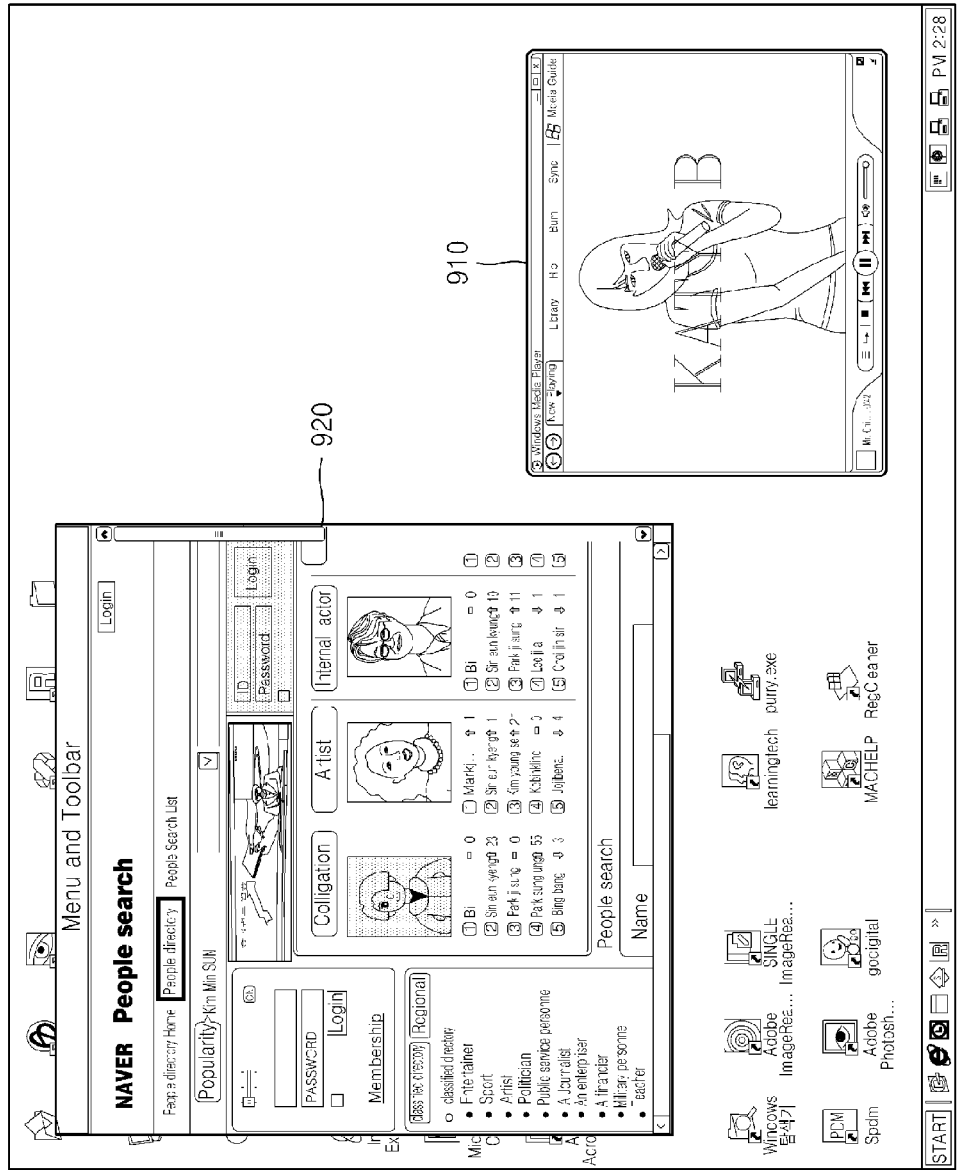
FIG. 9 is a view which explains a method of protecting screen information data, according to another exemplary embodiment.

FIG. 9 shows protected areas on a screen that is sent to the client device according to another exemplary embodiment.

FIG. 9 shows a case in which two objects are displayed on a single screen. The object 910 that is displayed as a result of running the media player and the object 920 that is displayed as a result of running a web browser are respectively included on the screen. In other words, two or more applications may run at the same time in the cloud server. Both of the objects may be protected, or only one object may be selectively protected, in accordance with the criteria for determining whether or not to protect data.

In the case in which both the objects are protected, the screen information data that corresponds to the area of each of the objects may be encrypted, or the screen information data that corresponds to the entire screen may be encrypted. In the case in which only one object of the two objects is protected, the screen information data corresponding to the area of the one object may be protected.

Figure 10:
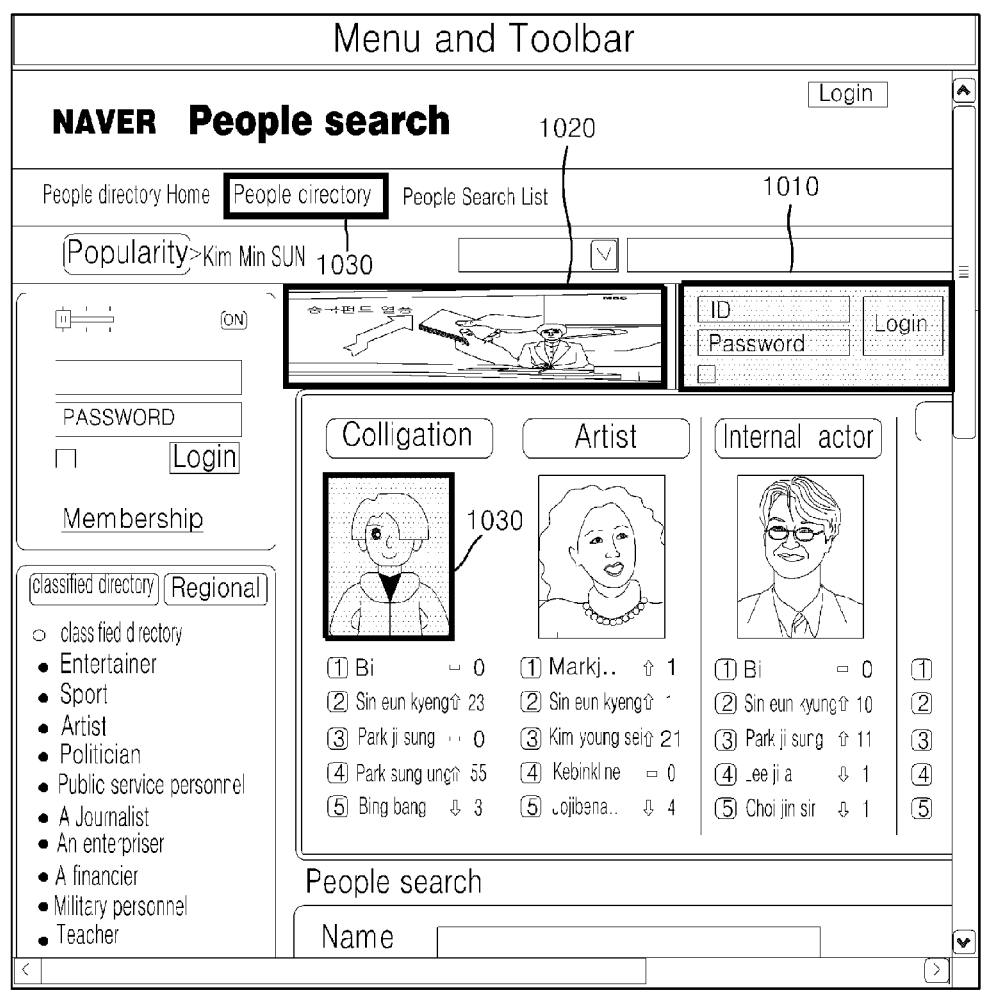
FIG. 10 is a view which explains a method of protecting screen information data, according to another exemplary embodiment.

FIG. 10 shows protected areas on a screen that is sent to the client device according to another exemplary embodiment.

FIG. 10 shows a case in which a screen includes a variety of kinds of objects. A text 1010, a video (or flash) 1020, and an image 1030 are objects contained on the screen. As mentioned above, depending on the type of the object, criteria may be set to determine whether or not to protect the object. Therefore, in the case in which at least one of an image, a video, and a text are to be protected, the screen information data that corresponds to the area of the corresponding object is encrypted. Also, the area of the screen that corresponds to a particular coordinate may also be protected. In this case, the screen information data which corresponds to the corresponding coordinate is encrypted.

FIG. 11 shows a protected area on a screen that is sent to the client device according to another exemplary embodiment.

FIG. 11 shows protection of screen information data in accordance with a lapse of time. In the case of wanting to protect the screen information data that is generated at a specific time, the screen information data that is generated at that specific time is encrypted.

In response to the screen information data being encrypted, even in response to the protection being bypassed at the network level due to a problem of hacking and the like, a third party who obtains the screen information data cannot decrypt the encrypted area. Therefore, security is increased and the data remains secure. Only a partial portion of screen information data that requires protection is encrypted, thus increasing the transmission efficiency and ensuring real-time processing of a user input.

According to the exemplary embodiments, when a cloud server provides screen information data which indicates a screen that is displayed on a client device in a cloud computing system, the cloud server selectively encrypts the screen information data, thus maintaining the security of the screen information data even when a network-level security problem occurs.

In addition, since all the screen information data is not encrypted, the transmission efficiency is largely unaffected, and thus the exemplary embodiments are advantageous for processing signals entered by a user in real-time.

Block diagram circuits for implementing the principles disclosed exemplary embodiments, and conceptual representations thereof will be able to be interpreted as by those skilled in the art. Similarly, any flow charts, flow diagrams, state transition diagram, pseudo code, and computer readable medium substantially representing the principles of the exemplary embodiments, whether or not any computer or processor is explicitly drawn between the various processes that can be executed by a computer or processor, will be recognized by those skilled in the art. Therefore, the above-described exemplary embodiments can be written into a program that can be stored as a data on a structure in a non-transitory computer implemented storage medium to be executed on a computer and can be implemented in a general-purpose digital computer to operate the program. The computer readable storage medium includes the storage media such as magnetic storage media (eg, ROM, floppy disk, hard disk, etc.), optical recording media (eg, CD-ROMs, DVD, etc.).

The functions of the various elements that shown in the drawings can be provided through the use of relevant dedicated hardware and appropriate software to run the software as well as the hardware. The provided processor may be a single dedicated processor, a single shared processor, or can be provided by a plurality of individual processors, some of which can be shared. In addition, the terms "processor" or "controls" refer to hardware that can run the software, and may be construed as, without limitation, digital signal processor (DSP) hardware and software for storing read only memory (ROM), random access memory (RAM), and a non-volatile storage device.

Elements are expressed herein as a way to perform a specific function in the claims and encompass any way to perform a specific function, and these elements include circuits that perform a specific function, or a combination of functions. Certain functions to may be combined to perform functions of the software for the appropriate circuit, firmware, micro-code, etc. and may include any form of software.

The exemplary embodiments and the variations of these expressions refer to those exemplary embodiments associated with a particular feature, structure, characteristics, and principles of the present invention and will be included in at least one exemplary embodiment. Therefore, the expression "exemplary embodiment" and any disclosed variant herein do not all necessarily refer to the same exemplary embodiment.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of enabling a cloud server to provide screen information data for displaying data on a screen of a client device, the method comprising:
    executing an application based on a user input received from the client device;
    generating the screen information data including an object configuring the screen, based on execution of the application;
    determining, by the cloud server, whether or not to protect the provided screen information data including the object configuring the screen, based on a characteristic of the object in order to encrypt the entire screen information data or a specific area of the screen information data, determined based on a type of the application executed in the cloud server and improving transmission efficiency;
    encrypting the provided screen information data based on the determination; and
    transmitting the encrypted screen information data to the client device,
    wherein the characteristics of the object comprise information regarding a location of the object on the screen,
    wherein the determining further comprises determining whether or not to protect the provided screen information corresponding to coordinate information determined based on the location of the object.

2. The method of claim 1, wherein the determining of whether or not to protect the screen information data is based on a type of object configuring the screen.

3. The method of claim 1, wherein the object configuring the screen comprises at least one of an image, a text and a video.

4. The method of claim 1, wherein the encrypting of the provided screen information data comprises encrypting the provided screen information data using entropy encoding and a symbol mapping algorithm.

5. The method of claim 1, further comprising:
    determining whether or not the client device is valid; and
    in response to the client device being valid, transmitting decoding information to the client device.

6. The method of claim 1, wherein the determining of whether or not to protect the provided screen information data comprises receiving criteria information related to the characteristic of the object configuring the screen, in order to determine whether or not to protect the provided screen information data requested from the client device.

7. The method of claim 1, wherein the determining of whether or not to protect the provided screen information data considers the characteristic of the object and predetermined time information.

8. A cloud server that provides screen information data related to a screen that displays data on a client device, the cloud server comprising:
    a screen information data generator comprising circuitry which is configured to generate the screen information data including an object configuring the screen, based on execution of the application in the cloud server, the execution is based on a user input received from the client device;
    a protection determiner comprising a circuit which is configured to determine whether or not to protect the generated screen information data including the object configuring the screen, based on characteristics of the object in order to encrypt the entire screen information data or a specific area of the screen information data, determined based on a type of the application executed in the cloud server and improving transmission efficiency;
    an encryptor comprising a circuit which is configured to encrypt the generated screen information data based on the determining; and
    a transmitter comprising a circuit which is configured to transmit the encrypted screen information data,
    wherein the characteristics of the object comprise information regarding a location of the object on the screen,
    wherein the protection determiner is further configured to determine whether or not to protect the provided screen information corresponding to coordinate information determined based on the location of the object.

9. The cloud server according to claim 8, wherein the encryptor is configured to encrypt some of the generated screen information data.

10. The cloud server according to claim 8, wherein the protection determiner is configured to determine whether or not to protect the generated screen information data based on a type of object configuring the screen.

11. The cloud server according to claim 8, wherein the object configuring the screen comprises at least one of an image, a text and a video.

12. The cloud server according to claim 8, wherein the encryptor is configured to perform encryption using entropy encoding and a symbol mapping algorithm.

13. The cloud server according to claim 8, further comprising a valid terminal decider comprising a circuit which is configured to determine whether or not the client device is a valid device, and transmit decoding information to the client device in response to the client device being valid, based on the results of the determining of whether or not the client device is a valid device.

14. The cloud server according to claim 8, further comprising a receiver comprising a circuit which is configured to receive criteria information related to the characteristics of the object in order to determine whether or not to protect the generated screen information data from the client device.

15. The cloud server according to claim 8, wherein the protection determiner is configured to determine whether or not to protect the generated screen information data in consideration of the characteristic of the object, and predetermined time information.

16. A non-transitory computer readable storage medium comprising a program, which when executed by a processor of a computer, causes the computer to perform the method of enabling a cloud server to provide screen information data for displaying data on a screen of a client device, the method comprising:

executing an application based on a user input received from the client device;

generating the screen information data including an object configuring the screen, based on execution of the application;

determining, by the cloud server, whether or not to protect the provided screen information data including the object configuring the screen, based on characteristics of the object in order to encrypt the entire screen information data or a specific area of the screen information data, determined based on a type of the application executed in the cloud server and improving transmission efficiency;

encrypting the provided screen information data based on the determination; and transmitting the encrypted screen information data to the client device, wherein the characteristics of the object comprise information regarding a location of the object on the screen, wherein the determining further comprises determining whether or not to protect the provided screen information corresponding to coordinate information determined based on the location of the object.

17. The method of claim 1, wherein the encrypting of the provided screen information data comprises encrypting some of the provided screen information data.

* * * * *